United States Patent
Katagiri

(10) Patent No.: US 8,687,473 B2
(45) Date of Patent: Apr. 1, 2014

(54) OVERWRITE CONTROL FOR DATA IN TAPE RECORDING APPARATUS

(71) Applicant: International Business Machines Corporation, Armonk, NY (US)

(72) Inventor: Takashi Katagiri, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/772,231

(22) Filed: Feb. 20, 2013

(65) Prior Publication Data

US 2013/0163397 A1    Jun. 27, 2013

Related U.S. Application Data

(63) Continuation of application No. 13/453,314, filed on Apr. 23, 2012, now Pat. No. 8,493,829, which is a continuation of application No. 13/128,875, filed as application No. PCT/JP2009/066781 on Sep. 28, 2009, now Pat. No. 8,416,663.

(30) Foreign Application Priority Data

Nov. 21, 2008    (JP) .................................. 2008-298477

(51) Int. Cl.
*G11B 27/36* (2006.01)

(52) U.S. Cl.
USPC ......... 369/53.36; 369/47.13; 369/83; 360/13; 360/31

(58) Field of Classification Search
None
See application file for complete search history.

(56) References Cited

U.S. PATENT DOCUMENTS

| | | | |
|---|---|---|---|
| 5,710,676 A | 1/1998 | Fry et al. | |
| 5,757,571 A | 5/1998 | Basham et al. | |
| 5,999,354 A | 12/1999 | Shitara | |
| 6,091,698 A * | 7/2000 | Hogan | 369/275.2 |
| 6,341,047 B1 * | 1/2002 | Ishii et al. | 360/72.2 |
| 6,349,356 B2 | 2/2002 | Basham et al. | |
| 6,424,478 B2 | 7/2002 | Hamai et al. | |
| 7,350,021 B2 | 3/2008 | Itagaki et al. | |
| 7,372,657 B2 | 5/2008 | Gill et al. | |

(Continued)

FOREIGN PATENT DOCUMENTS

| | | |
|---|---|---|
| EP | 2000897 | 12/2008 |
| JP | 1011908 | 1/1998 |

(Continued)

OTHER PUBLICATIONS

International Search Report for PCT/JP2009/066781 dated Nov. 10, 2009.

(Continued)

*Primary Examiner* — Thang Tran
(74) *Attorney, Agent, or Firm* — Konrad Raynes Davda & Victor LLP

(57) ABSTRACT

A tape recording apparatus in communication with a tape medium, and includes a head and a controlling unit to control the head to read and write data to the tape medium, wherein the controlling unit performs operations, comprising: determining an overwrite starting position by skipping data units whose beginning position cannot be determined until a data unit is reached having a beginning position that can be determined; and performing an overwrite operation at the overwrite starting position at the data unit whose beginning position can be determined.

21 Claims, 8 Drawing Sheets

(56) References Cited

U.S. PATENT DOCUMENTS

| | | | |
|---|---|---|---|
| 7,443,624 | B2 | 10/2008 | Itagaki et al. |
| 8,037,346 | B2 | 10/2011 | Katagiri et al. |
| 2001/0046099 | A1 | 11/2001 | Hamei et al. |
| 2002/0049932 | A1* | 4/2002 | Kuroda ............................ 714/42 |
| 2002/0110058 | A1* | 8/2002 | Hamada et al. ............ 369/47.13 |
| 2007/0079059 | A1 | 4/2007 | Itagaki et al. |
| 2007/0177293 | A1 | 8/2007 | Itagaki |
| 2007/0236817 | A1 | 10/2007 | Taruisi |
| 2008/0209420 | A1 | 8/2008 | Matsuo |
| 2008/0294954 | A1 | 11/2008 | Katagiri et al. |
| 2009/0103205 | A1* | 4/2009 | Oishi ........................ 360/77.12 |
| 2011/0051278 | A1 | 3/2011 | Brume et al. |
| 2011/0157741 | A1 | 6/2011 | Shiratori et al. |
| 2011/0222379 | A1 | 9/2011 | Katagiri |
| 2012/0212848 | A1 | 8/2012 | Katagiri |

FOREIGN PATENT DOCUMENTS

| | | |
|---|---|---|
| JP | 2000285407 | 10/2000 |
| JP | 200795231 | 4/2007 |
| JP | 2007265476 | 10/2007 |
| WO | 03083866 | 10/2003 |
| WO | 2007102434 | 9/2007 |

OTHER PUBLICATIONS

English translation dated Jun. 21, 2011 of PCT International Preliminary Report on Patentability for Application No. PCT/JP2009/066781 filed Sep. 28, 2009.
English translation dated Jun. 21, 2011 of PCT Written Opinion of the International Searching Authority for Application No. PCT/JP2009/066781 filed Sep. 28, 2009.
English machine translation of JP2000285407 Oct. 13, 2000 Fujitsu Ltd.
Preliminary Amendment dated Apr. 23, 2012, pp. 1-6, for U.S. Appl. No. 12/631,641, filed May 11, 2011, by inventor T. Katagiri.
Notice of Allowance dated Nov. 28, 2012, pp. 1-16, for U.S. Appl. No. 12/631,641, filed May 11, 2011, by inventor T. Katagiri.
Office Action dated Nov. 28, 2011, pp. 1-15, for U.S. Appl. No. 13/453,314, filed Apr. 23, 2012, by inventor T. Katagirk.
Extended European Search Report dated Sep. 26, 2013, pp. 6, for Application No. 09827436.8-1907/2337025, PCT/JP2009066781.
US Patent No. 8,037,436 issued Oct. 11, 2011 is the English counterpart of WO2007102434.

* cited by examiner

OVERWRITE CONTROL FOR DATA IN TAPE RECORDING APPARATUS

CROSS-REFERENCE TO RELATED APPLICATION

This application is a continuation of U.S. patent application Ser. No. 13/453,314, filed Apr. 23, 2012, which is a continuation of U.S. patent application Ser. No. 13/128,875, filed May 11, 2011, which is a national phase filing under 35 U.S.C. §371 of International Application PCT/JP2009/066781, filed Sep. 28, 2009, which claims priority from Japanese Patent Application No. JP2008-298477, filed Nov. 21, 2008, which U.S., PCT, and Japanese patent applications are incorporated herein by reference in their entirety.

BACKGROUND OF THE INVENTION

1. Field of the Invention

The present invention relates to a method for overwriting data onto a tape recording apparatus, and specifically to a technique for overwriting data that facilitates judgment on whether data is new or old when the data is to be read.

2. Description of the Related Art

Some tape drives such as those complying with LTO (Linear Tape Open) limit an interval between data units, i.e., units of writing and reading data, to a predetermined length or less (four meters or less in the LTO standard) for taking account of reading sequential data from a tape medium. Serial numbers are assigned to data units that are written onto a tape medium, and recorded onto the tape medium with the data units as management information.

The above-described rules are also applied to a case in which the data recorded onto the tape medium is overwritten with another data. Even if the tape medium has a fault such as damage, the faulty area is skipped and data may be overwritten at a position within a predetermined length from the overwrite-specified position. In such a case, however, since old data is left in the skipped area, information indicating whether the data is new or old is also recorded on the tape medium with the data units as management information (WO2003/083866).

In the LTO standard, the information indicating whether the data is new or old is called TapeWritePass (TWP). TWP is started at one and incremented by one each time when data is overwritten. It is assumed that, in the case of data reading, a data unit with a certain number is read and then another data unit with the same number that is present within the predetermined length from the first data unit is read. In that case, the data unit with the bigger value of TWP is dealt as the latest data, i.e., effective data.

That means a certain data unit cannot be determined as the latest data immediately after the data unit is read. In other words, in order to confirm that the read data unit is valid, the data for the predetermined length (four meters in the LTO standard) from the read data unit needs to be read and confirmed that the data does not include a data unit with the same data unit number as that of the read data and also with the bigger TWP than that of the read data. That requires quite complicated processing.

That is why some conventional tape drives such as those complying with LTO adopt a method below: assuming that data following the data unit with the number N is to be overwritten, the method requires the data unit with a new TWP value and the number N+1 to be written in a predetermined range (several millimeters) from the end of the data unit with the number N. In that manner, the method ensures that the old data with the number N+1 to be overwritten.

If data is overwritten in that manner, data unit C with the number M (M=N+1) and TWP (M) (here, TWP (N+1)>TWP (M)>=x) is not present between data unit A with the number N and TWP (N)=x and data unit B with the number N+1 and TWP (N+1)>=x, in principle. Therefore, since the data unit A can be confirmed as a valid data unit when the data unit B is found, quite a simple method for judging validity of data can be provided. TWP (i) indicates the TWP for the data unit with the number i.

Due to a fault such as damage to the tape medium, the data following the data unit with the number N cannot be written in the predetermined range (several millimeters) from the end of the data unit with the number N. In that case, information indicating that the write starting position is shifted is kept in a cartridge memory provided for the tape medium. Even in the case in which the data unit C is included as a result of shifting the write starting position, the above-described simple method for judging validity of data can be avoided in reading the data in that area based on the information indicating that the write stating position is shifted since the information is recorded in the cartridge memory. Accordingly, the old data cannot be mistaken for new data.

SUMMARY

The cartridge memory provided for the tape medium, however, may be physically broken or may not be accessed due to a contact failure or the like, if not broken. If the cartridge memory cannot be accessed, whether the overwrite position has been shifted or not cannot be checked by any means. In such a case, whether a data unit with the bigger TWP is present within the predetermined length or not needs to be checked one by one. Therefore, the above-described conventional method does not provide a perfect solution to avoid a complicated reading method.

Therefore, an object of the present invention is to provide a tape recording apparatus, a data overwrite control method, and a data overwrite control program that can solve the above-described problems. In other words, an object of the present invention is to facilitate judgment on validity of read data whether or not the cartridge memory can be accessed.

The inventor has noticed that a data overwrite position can be predicted to some extent since the sequential access device is basically adapted to add data to the end of data that has already been recorded on the tape medium. Then, the inventor has prepared a tape medium with redundancy ensured by previously writing one or more NULL data units before the EOD (End Of Data) at the time of ending writing of data. Consequently, the inventor has considered that the above-described object is achieved by a tape recording apparatus that overwrites data onto such a tape medium in a certain method.

Specifically, the present invention for achieving the foregoing object is realized by the following tape recording apparatus, which includes: a receiving unit for receiving information on an overwrite starting position and an overwrite request; a trying unit for trying to determine a beginning position of a data unit based on the information on the overwrite starting position, wherein the data unit is a unit of writing data recorded on a tape medium; an overwrite executing unit for executing overwriting from the determined overwrite starting position in response to a success of the determination by the trying unit; and a type judging unit for judging whether the data unit that is recorded at the overwrite starting position is a null data unit or not in response to a failure of the determination by the trying unit. The trying unit responds to judgment that the data unit is the null data unit by trying to determine a beginning of a data unit following the data unit as the overwrite starting position.

Preferably, the type judging unit judges whether the following data unit is the null data unit or not in response to a failure of the determination of the beginning of the following data unit by the trying unit; and the trying unit tries to determine a beginning of a data unit following the following data unit as the overwrite starting position in response to judgment that the following data unit is the null data unit.

More preferably, processing by the type judging unit is repeated each time when the trying unit fails in determining the beginning of a judgment object data unit until the judgment object data unit is judged to be not the null data unit.

Preferably, the tape recording apparatus further includes an error notifying unit for notifying an error in response to the judgment that the data unit is not the null data unit by the type judging unit.

Preferably, the tape recording apparatus further includes a result judging unit for judging whether the overwrite executing unit succeeded in overwriting or not; and an overwrite retrying unit for causing the overwrite executing unit to retry overwriting from a beginning of a second data unit that follows a first data unit on the condition that the first data unit is the null data unit in response to the judgment of a failure by the result judging unit, wherein overwriting is failed for the first data unit. The retrial of the overwriting by the overwrite retrying unit includes determination processing on a beginning position of the second data unit.

More preferably, the tape recording apparatus further includes an error notifying unit for notifying an error when the first data unit is not the null data unit.

Yet more preferably, the overwrite retrying unit causes the error notifying unit to notify an error in response to the second judgment of a failure by the result judging unit.

Although the present invention has been described above as a tape recording apparatus, the present invention can also be embodied as an overwrite control method for controlling data overwriting or a control program that is executed in such a tape recording apparatus, or a storage medium that stores the control program.

According to the present invention, if a position that is initially specified as an overwrite starting position cannot be determined, the area is skipped and data overwriting is retried on the following area on the condition that a data unit that is recorded at the position that is initially specified as an overwrite starting position is a null data unit (NULL data) that has been prepared for the purpose of offering redundancy to the overwrite position. Since old data unit recorded at the area that has been skipped for overwriting is a null data unit that can be distinguished from the user data, even if the data unit is read in data reading, the data unit is not returned to the host device as user data. Therefore, according to the present invention, resistance to an error at the overwrite starting position can be enhanced, which eliminates requirement of recording that the overwrite position is shifted in a cartridge memory. Accordingly, the present invention facilitates judge processing on data validity in data reading whether the cartridge memory is accessible or not. The other advantages of the present invention can be understood from the description of embodiments.

BRIEF DESCRIPTION OF THE DRAWINGS

FIG. 1(*b*) is a diagram showing an example of an arrangement of bands 15 in an LTO data format;

FIG. 1(*c*) is a diagram showing an example of an arrangement of blocks 30 in the LTO data format;

FIG. 2(*b*) is a diagram showing the tape medium 10 shown in FIG. 2(*a*) on which data is overwritten;

FIG. 2(*c*) is a diagram showing the tape medium 10 shown in FIG. 2(*a*) on which a part of the tape medium 10 was damaged and then the data has been overwritten;

FIG. 2(*d*) is a diagram showing the tape medium 10 shown in FIG. 2(*a*) in another state on which a part of the tape medium 10 was damaged and then data has been overwritten;

FIG. 5(*b*) is a diagram showing the tape medium 10 on which data is overwritten from the beginning of a DS that has been specified to be overwritten;

FIG. 6(*b*) is a diagram showing the tape medium 10 shown in FIG. 6(*a*) on which data is overwritten;

FIG. 7(*b*) is a diagram showing the tape medium 10 shown in FIG. 7(*a*) on which data is successfully overwritten at a retrial;

FIG. 7(*c*) is a diagram showing the tape medium 10 shown in FIG. 7(*a*) on which the overwriting of data is failed at a retrial;

FIG. 8(*b*) is a diagram showing the tape medium 10 shown in FIG. 8(*a*) on which data is successfully overwritten at a retrial.

DETAILED DESCRIPTION

Figure 1A:
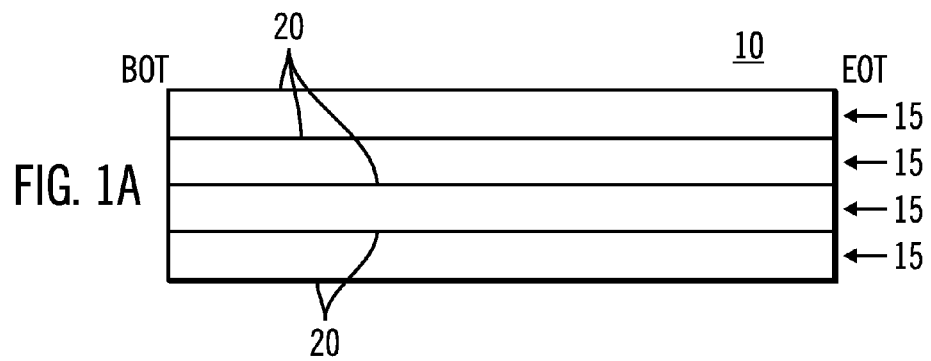
FIG. 1(*a*) is a diagram showing an example of a configuration of a recording area of a tape medium 10 complying with the LTO standard.

While the preferred embodiments of the present invention will be described in detail hereinafter with reference to accompanying drawings, it is to be understood that the following embodiments are not intended to limit the invention according to the claims, and all of the combinations of features described in the embodiments are not always essential to the solving means of the invention. The same components are designated by the same reference numerals through the description of the embodiments.

Although the present invention will be described below by taking an example of a tape recording apparatus complying with the LTO (Linear Tape Open) standard, the present invention is not limited to be applied to the tape recording apparatus complying with the LTO standard. The present invention can be applied to any tape recording apparatus, if only the tape recording apparatus can read and write data from and onto a tape medium on which a null data unit that can be distinguished from user data is written before a data unit that indicates the end of the user data (the EOD in the LTO standard). The LTO standard is an open format standard jointly developed by Hewlett-Packard, IBM, and Seagate (now, Quantum).

Before starting to describe the present invention, an arrangement of the recording area of a tape medium complying with the LTO standard will be described with reference to FIG. 1. As shown in FIG. 1(a), the tape medium 10 has a plurality of bands 15 arranged along a longitudinal direction of the tape medium 10 between BOT (Beginning Of Tape) and EOT (End Of Tape). On both sides of each of the plurality of bands 15, servo tracks 20 for controlling a data write position are provided along the longitudinal direction.

Figure 1B:
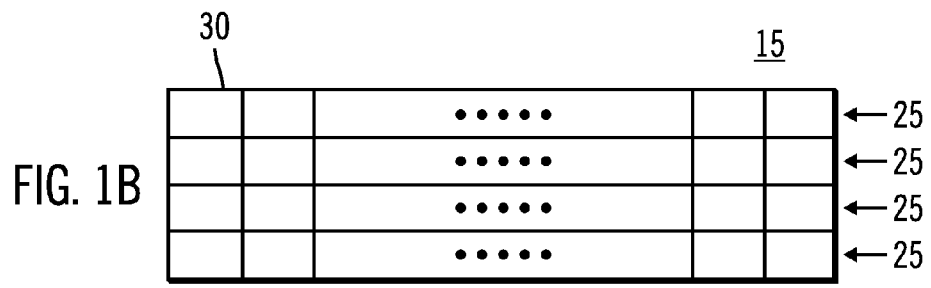

As shown in FIG. 1(b), each of the bands 15 has multiple data tracks 25 arranged along the longitudinal direction of the tape medium 10. The width in the short-side direction of the tape medium 10 in each of the data tracks 25 is the width into which data is written by the tape recording apparatus at a time. Each of the data tracks 25 has a plurality of blocks 30 along the longitudinal direction of the tape medium 10. Each of the blocks 30 contains a plurality of data sets (Data Set, DS) 35.

Figure 1C:
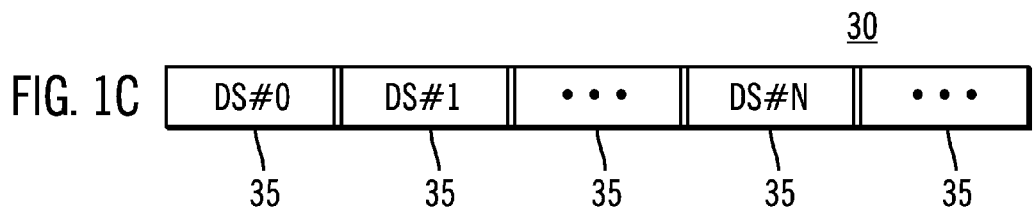

The tape recording apparatus complying with the LTO standard reads and writes data by the unit of DS 35. That is, in the LTO standard, the data unit that is the unit of reading and writing data is called the DS 35. As shown in FIG. 1(c), serial numbers, i.e., DS numbers, are assigned to the DS 35 in order from the beginning position of the tape medium 10. The DS 35 consists of two areas of a data area and a Data Set Information Table (DSIT). In the data area, literally user data is recorded, while in the DSIT area, management information for managing the DS 35 is recorded.

The management information contained in the DSIT includes the DS number and the TapeWritePass (TWP). Here, the TWP is information used in judging whether the data is old or not. When data is recorded for the first time, the TWP value is one, and the value is incremented by one each time data is overwritten.

With reference to FIG. 2, a method for judging whether the data is new or old based on the TWP and problems in conventional data overwriting will be described. It is assumed that data is recorded in order such as DS#N–1, DS#N . . . , at first in portions (a position 200 to a position 206) on the tape medium 10, as shown in FIG. 2(a). Each DS is data that is written onto the tape medium 10 for the first time, thus, the value of the TWP of each DS indicates one.

Figure 2A:
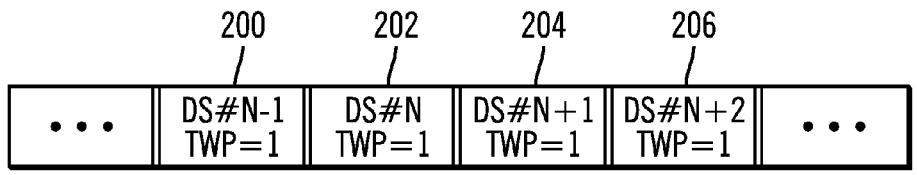
FIG. 2(*a*) is a diagram showing the tape medium 10 complying with the LTO standard in a state in which data is written for the first time.
Figure 2B:
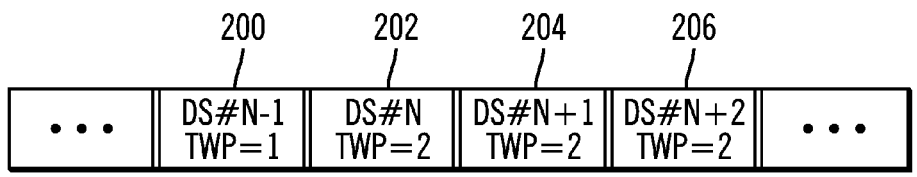

The result of overwriting data from the beginning of DS#N that is recorded at the position 202 on the tape medium 10 in such a state as shown in FIG. 2(a) is shown in FIG. 2(b). In FIG. 2(b), since DS#N, DS#N+1, and DS#N+2 that are respectively recorded at from the position 202 to the position 206 are overwriting data, the value of each TWP is incremented by one to be two.

Figure 2C:
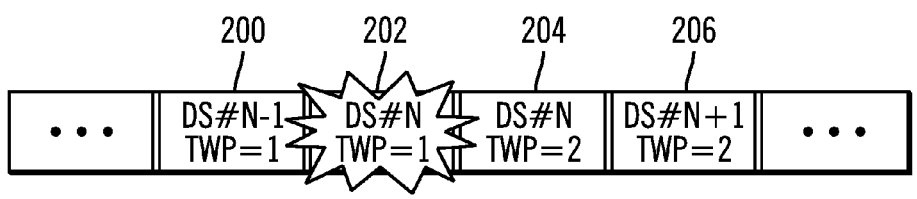

Now, it is assumed that the area at the position 202 cannot be written (but can be read) due to damage or sticking of a foreign matter such as dust or the like to the surface of the tape medium 10. If data cannot be written onto the tape medium 10 for some reasons, the LTO standard allows the data to be kept written within four meters from the faulty portion on the tape medium 10 after storing information indicating that the area is skipped in the cartridge memory. Accordingly, by the conventional overwriting method, the faulty position 202 is skipped and the data is overwritten from the position 204 as shown in FIG. 2(c). Since DS#N that is recorded at the position 204 is overwriting data, the value of the TWP is incremented by one to be two.

Now, it is assumed that data is read from the tape medium 10 in the state as shown in FIG. 2(c). Here, DS with the number N is obtained twice serially. However, referring to the values of the TWP of both DS's, the TWP of DS#N at the position 202 has the value of one, while the TWP of DS#N at the position 204 has the value of two. Therefore, it is understood that DS#N at the position 204, which has the larger values of the TWP, is the later data. As such, the LTO standard allows whether the data is new or old to be judged according to the values of the TWP.

Figure 2D:
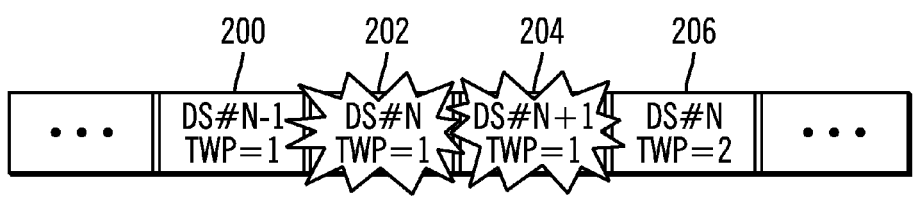

Since one DS has been skipped in the example shown in FIG. 2(c), validity of DS#N at the position 202 can be immediately judged when DS#N at the following position 204 is read. The conventional overwriting method, however, allows the data to be kept written within four meters from the faulty portion on the tape medium 10 after storing information indicating that the area is skipped in the cartridge memory as described above. As the result, in actual cases, the plurality of DS's that cannot be written may be skipped and data may be overwritten as shown in FIG. 2(d). In the example shown in FIG. 2(d), validity of DS#N at the position 202 cannot be judged until DS#N at the position 206 that is two positions later than the position 202, if the information in writing that is recorded in the cartridge memory is not used. As such, in the conventional overwriting method, when the information in the cartridge memory is not available, data for four meters from any read DS needs to be read in order to confirm that the read DS is valid.

Figure 5A:
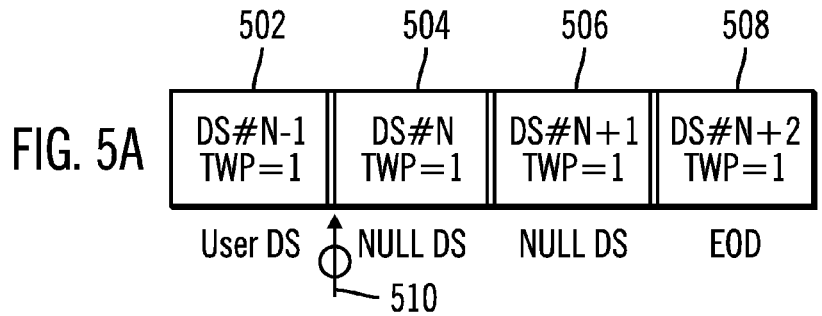
FIG. 5(*a*) is a diagram showing an example of the tape medium 10 with redundancy ensured at a position that is expected to be an overwrite starting position for data in future.

Then, in order to solve the above-described problems, the present invention offers redundancy to the position that is expected to be the overwrite starting position for the data in future on the tape medium 10. That is, since the sequential access device is basically adapted to add data to the end of data that has already been recorded on the tape medium 10, the present invention previously writes one or more NULL DS's that can be distinguished from the user data before the end of a series of DS's, i.e., before the EOD, when the data is to be written as shown in FIG. 5(a).

Even if NULL DS is read in data reading, the NULL DS is not returned to a host device. The number of DSs to be written for the purpose of offering redundancy is empirically obtained, such as two, for example. Two or the like NULL DSs written at the end of writing may little affect the writing performance. Since the NULL DSs are to be overwritten by the user data later unless an error occurs in that data overwriting, the NULL DSs do not reduce the capacity of the tape medium 10. The data overwriting method according to an embodiment of the present invention to such a tape medium 10 will be described later with reference to FIG. 4 to FIG. 9.

Figure 3:
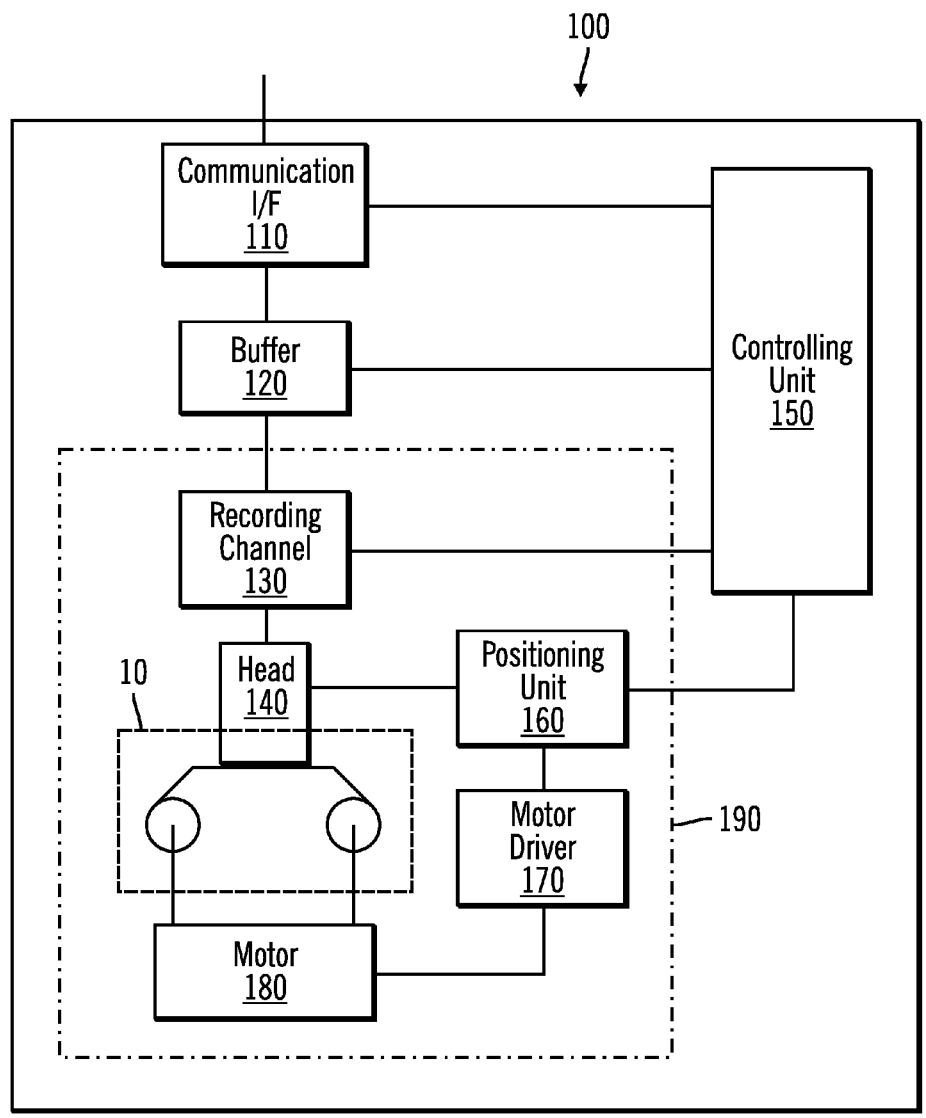
FIG. 3 is a diagram showing an example of a hardware configuration of a tape recording apparatus 100 according to an embodiment of the present invention.

FIG. 3 shows an example of a hardware configuration of a tape recording apparatus 100 to which an embodiment of the present invention is applied. The tape recording apparatus 100 includes an interface 110, a buffer 120, a recording channel 130, a read and write head 140, a controlling unit 150, a positioning unit 160, a motor driver 170, and a motor 180.

The communication interface 110 communicates with the host device over a network. For example, the communication interface 110 receives, from the host device, a write command to instruct the writing of data onto a tape medium 10 and user data to be written. The communication interface 110 also receives, from the host device, a read command to instruct reading of data from the tape medium 10. The communication interface 110 further receives, from the host device, a locate command to instruct the write position and the read position. When data has been already recorded at the position at which the writing of data is instructed, the write command is an overwrite command.

When the tape recording apparatus 100 and the host device communicate with each other by an SCSI interface, for example, the write command corresponds to Write command, the read command corresponds to Read command, and the locate command corresponds to Locate command.

The buffer 120 is a memory for temporarily storing data to be written onto the tape medium 10 and data read from the tape medium 10. For example, the buffer 120 is formed of a DRAM (Dynamic Random Access Memory). The recording channel 130 is a communication path used for writing the data stored in the buffer 120 onto the tape medium 10 or for temporarily storing the data read from the tape medium 10 in the buffer 120.

The read and write head 140 has a data read and write element, performs the writing of data onto the tape medium 10, and performs the reading of data from the tape medium 10. The read and write head 140 according to the embodiment also has a servo read element, and reads signals from servo tracks provided on the tape medium 10. The positioning unit 160 instructs the read and write head 140 to move in a short-side direction (width direction) of the tape medium 10. The motor driver 170 drives the motor 180.

The controlling unit 150 controls the entire tape recording apparatus 100. Specifically, the controlling unit 150 controls the writing and overwriting of data onto the tape medium 10, and controls the reading of data from the tape medium 10 according to the commands received through the communication interface 110. The controlling unit 150 also controls the positioning unit 160 according to the signal read from the servo track. The controlling unit 150 further controls movement of the motor 180 through the positioning unit 160 and the motor driver 170. Note that the motor driver 170 may be connected directly to the controlling unit 150. The data overwrite control by the controlling unit 150 according to the embodiment of the present invention will be described later with reference to FIG. 4 to FIG. 9.

The controlling unit 150 as described above is achieved by a CPU, RAM and ROM (not shown). Here, the ROM stores programs for allowing the controlling unit 150 to provide the foregoing functions after the tape recording apparatus 100 is started. The programs containing a boot program to be executed by the CPU when the tape recording apparatus 100 is started, and containing the control program for controlling the overwriting of data according to the embodiment of the present invention. The CPU executes the programs by using the RAM.

Figure 4:
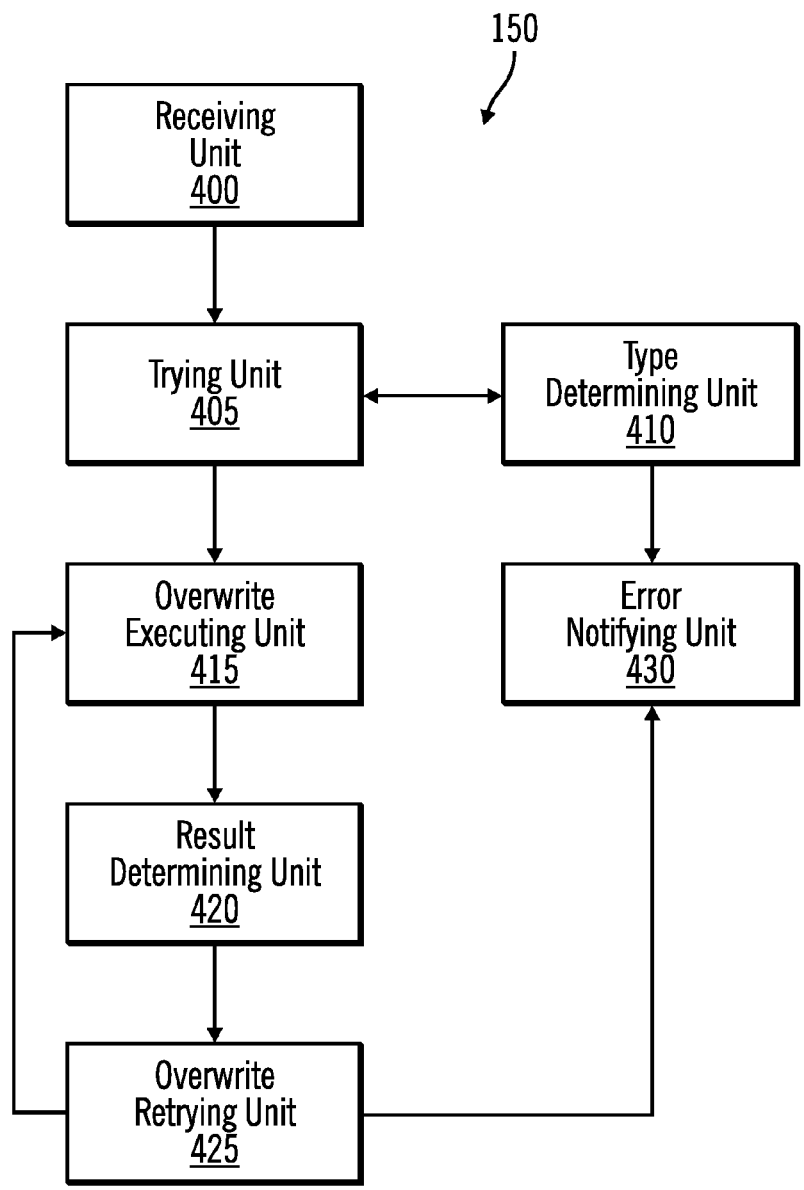
FIG. 4 is a diagram showing an example of a functional configuration of the tape recording apparatus 100 (controlling unit 150) according to an embodiment of the present invention.

FIG. 4 shows an example of a functional configuration of the controlling unit 150 of the tape recording apparatus 100 according to an embodiment of the present invention. The controlling unit 150 includes a receiving unit 400, a trying unit 405, a type judging unit 410, an overwrite executing unit 415, a result judging unit 420, an overwrite retrying unit 425, and an error notifying unit 430.

The receiving unit 400 receives information on an overwrite starting position and an overwrite request. The information is passed from the communication interface 110 to the controlling unit 150, i.e., the receiving unit 400. The information on the overwrite starting position and the overwrite request that are received from the receiving unit 400 are then passed to the trying unit 405, which will be described later.

The trying unit 405 tries to determine the beginning position of the data unit, the DS, i.e., a unit of writing data that is recorded on the tape medium 10 based on the information on the overwrite starting position that is passed from the receiving unit 400. In order to determine the beginning position of the DS, which is to be the overwrite starting position, the detailed ending position of the DS that is just before the DS concerned needs to be determined. This is because the existing valid data might be deleted. When the reading of the signals from the servo tracks becomes unstable due to damage or sticking of a foreign mater such as dust or the like to the surface of the tape medium 10, the detailed ending position of the DS that is just before the DS concerned cannot be determined. Therefore, the trying unit 405 cannot determine the beginning position of the DS, which is to be the overwrite starting position.

If the trying unit 405 cannot determine the beginning position of the DS as the overwrite starting position, the trying unit 405 passes the DS number of the DS that is specified as the overwrite starting position to the type judging unit 410, which will be described later. When the trying unit 405 can determine the beginning position of the DS as the overwrite starting position, the trying unit 405 passes the determined overwrite starting position to the overwrite executing unit 415, which will be described later.

In response to a failure of determination of the overwrite starting position by the trying unit 405, the type judging unit 410 judges whether the DS that is recorded at the overwrite starting position can be distinguished from the user data, i.e., NULL (NULL DS) or not. The type judging unit 410 does the determination by reading the type of the DS recorded in the DSIT from the flag indicating the type, for example. Alternatively, the type judging unit 410 may judge whether the DS is the NULL DS or not from the information that is recorded in other than the DSIT.

When the type judging unit 410 judges that the DS recorded at the overwrite starting position is the NULL DS, the type judging unit 410 notifies the trying unit 405 of the judgment result. In that case, in response to the judgment result by the type judging unit 410 that the DS is the NULL DS, the trying unit 405 tries to determine the beginning position of the next DS following to the DS as the new overwrite starting position. When the trying unit 405 fails in determining the beginning position of the next DS, the type judging unit 410 judges whether the next DS is the NULL DS or not in response to the failure of determination of the beginning position of the next DS by the trying unit 405. In response to the judgment result by the type judging unit 410 that the next DS is the NULL DS, the trying unit 405 tries to determine the beginning position of the further next DS that follows to the next DS as the latest overwrite starting position again.

As such, the processing by the type judging unit 410 is repeated each time when the trying unit 405 fails in determining the beginning of the DS to be judged until the judgment object DS is judged as not the NULL DS. When the type judging unit 410 judges that the judgment object DS is not the NULL DS, the type judging unit 410 notifies the error notifying unit 430, which will be described later, of the judgment result.

In that manner, when the specified overwrite starting position cannot be determined, the tape recording apparatus 100 according to the embodiment of the present invention tries to keep overwriting by skipping the area on the condition that the DS recorded at the position that is specified to be overwritten is the NULL DS that can be distinguished from the user data. This is because, if the DS recorded at the position that is specified to be overwritten is the NULL DS and that NULL DS is left on the tape medium 10, that left DS is not returned to the host device as the user data in the data reading.

In response to the success of determination of the overwrite starting position by the trying unit 405, the overwrite executing unit 415 executes overwriting from the determined overwrite starting position. The overwriting of data by the overwrite executing unit 415 is the same as the overwriting of data, i.e., writing of data, by the conventional tape recording apparatus. Here, it is assumed that, before starting the overwriting, the overwrite executing unit 415 keeps the ending position of the DS to which the data is to be overwritten.

The result judging unit 420 judges whether the overwriting by the overwrite executing unit 415 succeeded or not. Specifically, when the overwrite executing unit 415 writes the DS onto the overwrite starting position of the tape medium 10, the result judging unit 420 immediately checks that the DS can be read and judges whether the DS is recorded or not.

When the DS is successfully written, the result judging unit 420 notifies the overwrite executing unit 415 of the judgment result of the overwriting success. Then, the overwrite executing unit 415 keeps the overwrite processing. If the DS is not successfully written, the result judging unit 420 notifies the overwrite retrying unit 425, which will be described later, of the judgment result of the overwriting failure.

In response to the judgment that the overwriting failed by the result judging unit 420, the overwrite retrying unit 425 causes the overwrite executing unit 415 to try the overwriting from the beginning of the second DS that follows the first DS again on the condition that the first DS, to which the overwriting is failed, is the NULL DS. If the first DS is not the NULL DS, the overwrite retrying unit 425 notifies the error notifying unit 430, which will be described later, that the first DS is not the NULL DS. The overwrite executing unit 415 tries to determine the beginning position of the second DS based on the kept ending position of the DS to which the overwriting is failed.

As such, the overwrite retrying unit 425 allows for the failure of the overwriting of DS at the overwrite starting position only once. This is because: generally, since a partly overwritten DS is not a perfect DS, the tape recording apparatus 100 recognizes the DS as garbage. The tape recording apparatus 100, however, may read the partly overwritten DS by accident. If only one of such a partly overwritten DS is present, the DS with the same DS number as that of the partly overwritten DS and with the bigger TWP value is present immediately after the partly overwritten DS. Therefore, validity of the accidentally read DS can be immediately judged.

If a plurality of partly overwritten DSs are present, it is also required to read sequential plurality of DSs in order to judge validity of the DSs. That is, complicated processing is required to judge validity of the DSs. Therefore, in the present invention, the overwrite retrying unit 425 allows for the failure of the overwriting of DS at the overwrite starting position only once.

If the overwrite executing unit 415 fails in overwriting the second DS from the beginning, the judgment result of the overwriting failure is notified from the result judging unit 420 to the overwrite retrying unit 425 again. In that case, since the failure is the second overwriting failure, the overwrite retrying unit 425 notifies the error notifying unit 430, which will be described later, of the judgment result of the overwriting failure without allowing to retry the overwriting.

In response to the judgment by the type judging unit 410 that the DS is not the NULL DS, the error notifying unit 430 notifies the host device of the error indicating the overwriting failure. In response to the reception of the judgment result of the overwriting failure from the overwrite retrying unit 425, the error notifying unit 430 notifies the host device of the error indicating the overwriting failure.

Now, the fact that the judgment of validity of DS is not complicated when the tape recording apparatus 100 according to the embodiment of the present invention overwrites the data will be specifically described with reference to FIG. 5 to FIG. 8. As described above, FIG. 5(a) shows an example of the tape medium 10 on which the tape recording apparatus 100 according to the embodiment of the present invention has an effect. As apparent from FIG. 5(a), two NULL DSs (DS numbers=N, N+1, TWP=1) are recorded between EOD (DS number=N+2, TWP=1) and the user data (DS number=N-1, TWP=1) on the tape medium 10.

Figure 5B:
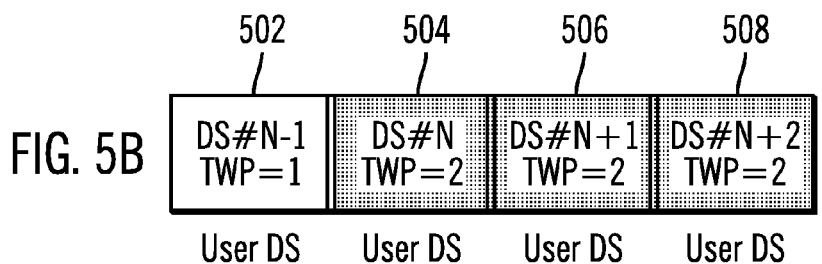

It is assumed that the receiving unit 400 receives an overwrite request with the DS recorded at the position 504 being the overwrite starting position for the tape medium 10 in that state. First, consider a case in which the beginning of the DS that is recorded at the position 504 (see an arrow 510) is successfully determined by the trying unit 405 and the overwriting by the overwrite executing unit 415 succeeds. The tape medium 10 after subjected to the overwriting under the condition is shown in FIG. 5(b). In that case, since the overwriting starts at the position 504 that is initially specified as the overwrite starting position, the tape medium 10 shown in FIG. 5(b) does not have an old, i.e., invalid DS.

Figure 6A:
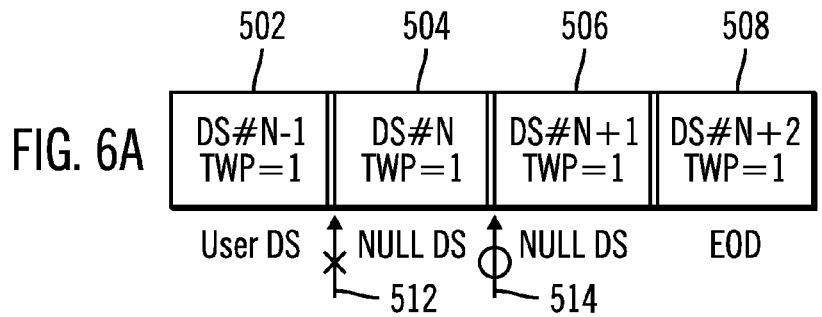
FIG. 6(*a*) is a diagram showing the tape medium 10 with redundancy ensured and a beginning position of the DS following the DS that has been specified to be overwritten determined.
Figure 6B:
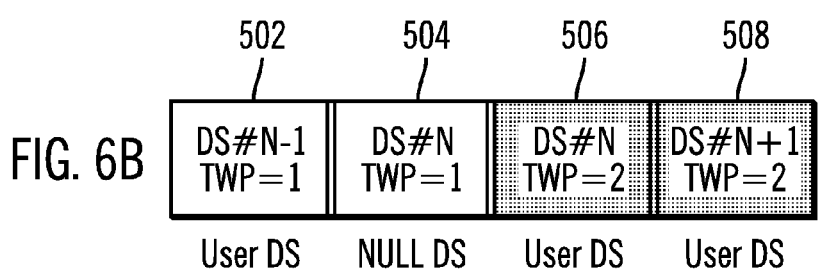

Now, consider a case in which determination of the specified overwrite starting position is failed (see an arrow 512) but the type judging unit 410 confirms that the DS recorded at the position 504 is the NULL DS, the trying unit 405 succeeds in determining the beginning of the next DS (see an arrow 514) and the overwrite executing unit 415 succeeds in overwriting as shown in FIG. 6(a). The tape medium 10 after subjected to the overwriting under the condition is shown in FIG. 6(b). In that case, the DS at the position 504 is skipped and the overwriting starts at the DS at the position 506. As a result, an old DS is left at the position 504. Since the DS is the NULL DS, even if the DS is read in the reading, the DS is not returned to the host device, thus, the validity judge processing does not become complicated.

Figure 7A:
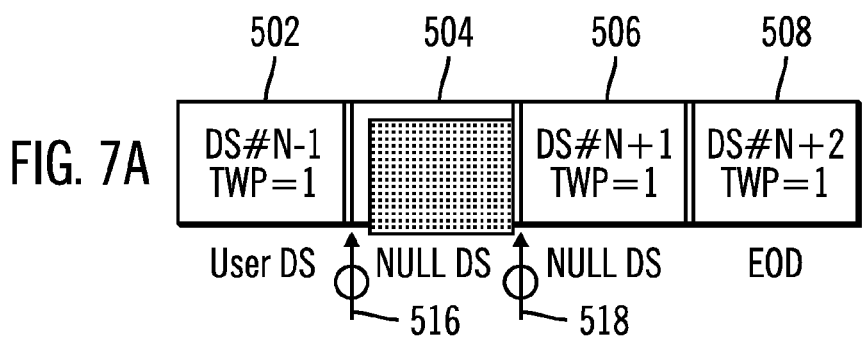
FIG. 7(*a*) is a diagram showing the tape medium 10 with redundancy ensured on which the overwriting of data at the position that has been specified to be overwritten is failed.

Now, consider a case in which the trying unit 405 succeeds in determining the specified overwrite starting position (see an arrow 516) but the overwrite executing unit 415 fails in overwriting as shown in FIG. 7(a). As described above, in the present invention, the failure of the overwriting is allowed for only once. Here, consider a case in which the overwrite executing unit 415 succeeds in overwriting the next DS that is recorded at the position 506.

Figure 7B:
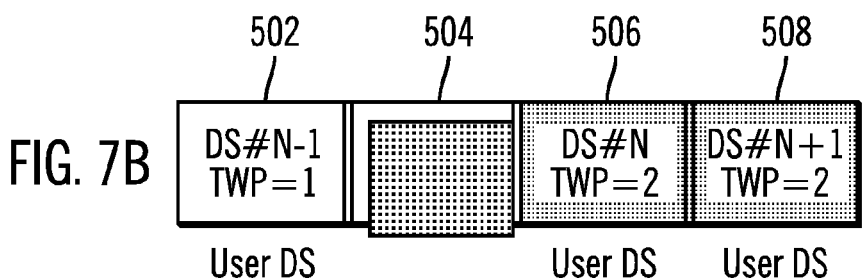

FIG. 7(b) shows the tape medium 10 after subjected to the overwriting under such a condition. In that case, since the overwriting starts at the DS at the position 506, the partly overwritten DS at the position 504 is left as it is. Even if the DS at the position 504 is read by accident, since the DS with the same DS number and the bigger TWP value than that of the DS concerned is present at the immediately next position 506, the validity judge processing does not become complicated.

Figure 7C:
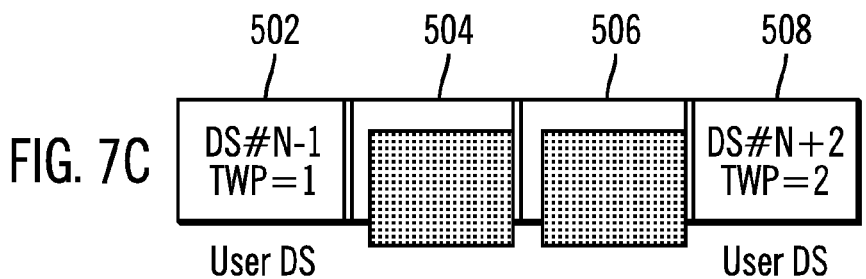

If the overwriting of the next DS recorded at the position 506 is also failed, a plurality of partly overwritten DSs are left as shown in FIG. 7(c). For that reason, in order to judge validity of the DS's, a plurality of following DS's need to be read. Since that complicates the validity judge processing, the second and later overwriting failure is not allowed for.

Figure 8A:
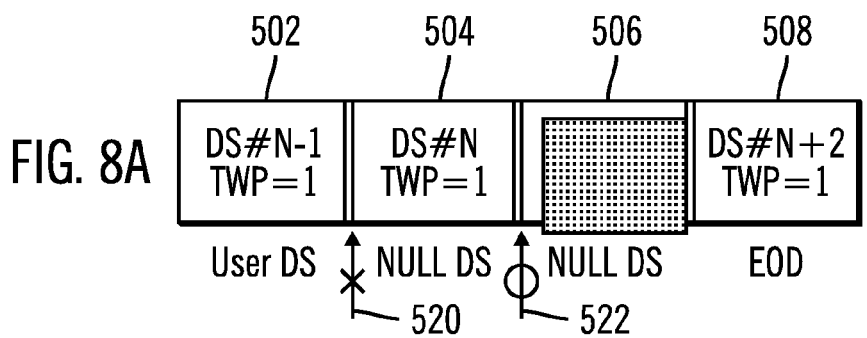
FIG. 8(*a*) is a diagram showing the tape medium 10 with redundancy ensured on which determination and overwriting are failed at the position that has been specified to be overwritten.

Finally, consider a case in which the determination of the specified overwrite starting position is failed (see an arrow 520) but the type judging unit 410 confirms that the DS recorded at the position 504 is the NULL DS and the trying unit 405 succeeds in determining the beginning of the next DS (see an arrow 522) as shown in FIG. 8(a). However, here, unlike the case shown in FIG. 6, the overwrite executing unit 415 fails in overwriting for the DS at the position 506 and succeeds in overwriting for the DS at the position 508 for the first time in this case.

Figure 8B:
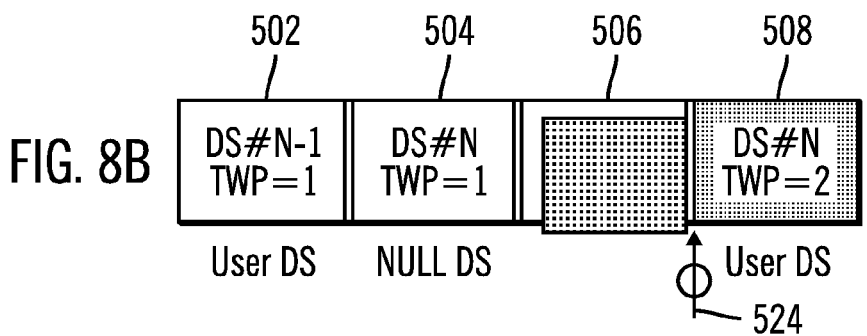

FIG. 8(b) shows the tape medium 10 after subjected to the overwriting under such a condition. In that case, the DS at the position 504 is skipped and the overwriting starts at the position 506. As a result, an old DS is left at the position 504. Since the DS is the NULL DS, the DS is not returned to the host device, even if the DS is read in reading, thus, that does not complicate the validity judge processing. Since the overwriting starts at the DS at the position 508, the partly overwritten DS at the position 506 is left as it is. Even if the DS at the position 506 is read by accident, since the DS with the bigger TWP value than that of the DS concerned is present at the immediately next position 508, the validity judge processing does not become complicated. As such, wherever the overwrite starting position is, the failure of the overwriting is allowed for only once.

Figure 9:
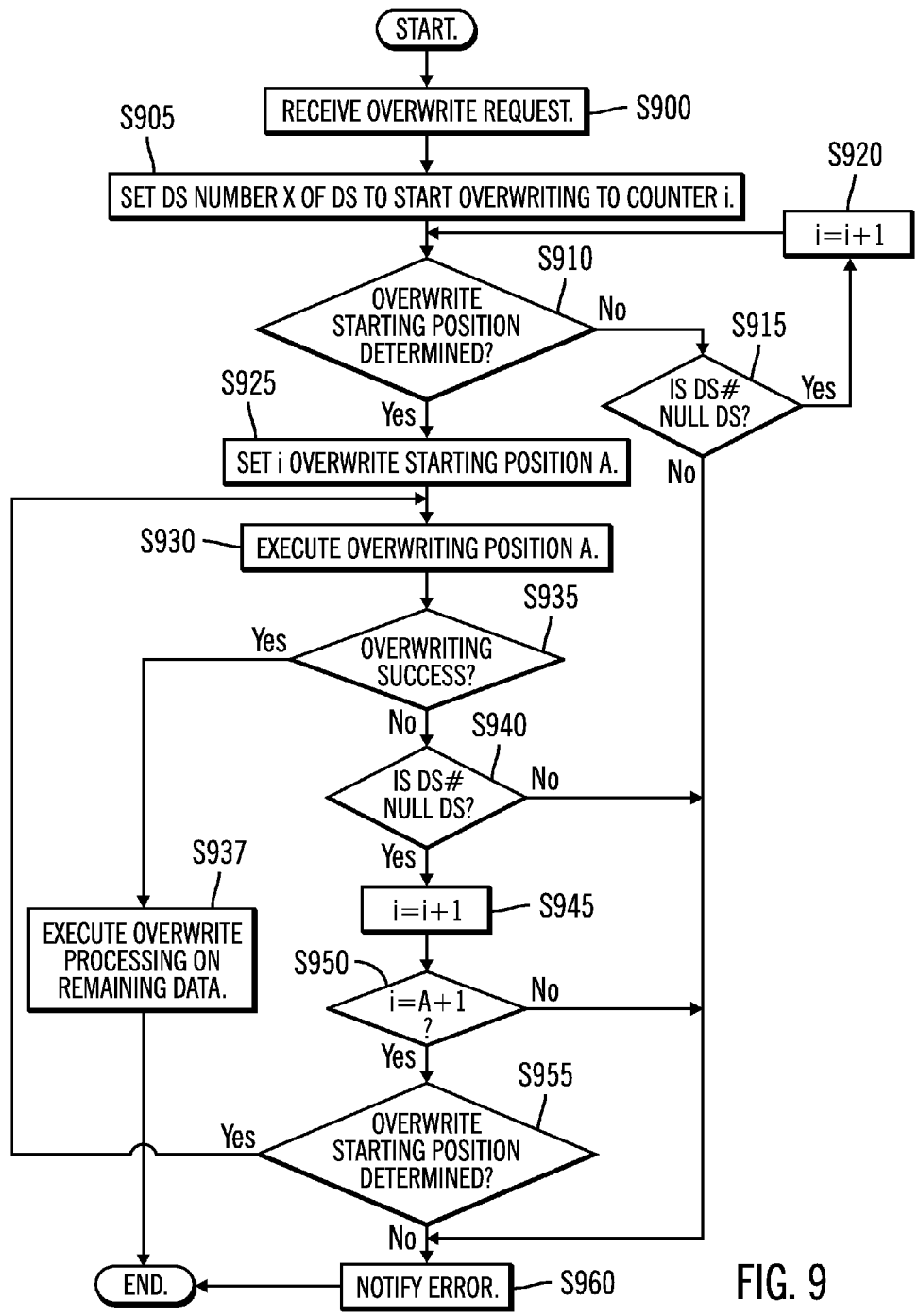
FIG. 9 is a flowchart showing a flow of data overwrite processing in the tape recording apparatus 100 according to the embodiment.

Now, operations of the tape recording apparatus 100 according to the embodiment will be described with reference to the flowchart shown in FIG. 9. The flowchart shown in FIG. 9 starts when a data overwrite request is received from the host device (step 900). The tape recording apparatus 100 sets the DS number X of the DS at which the data overwriting starts to a counter i (step 905). Then, the tape recording apparatus 100 tries to determine the beginning position of the DS of the DS number i (step 910).

If the beginning position of the DS of the DS number i cannot be determined (step 910: NO), the tape recording apparatus 100 judges whether the DS of the DS number i is the NULL DS or not (step 915). When the DS of the DS number i is the NULL DS (step 915: YES), the tape recording apparatus 100 increments the value of the counter i by one (step 920), and returns to step 910. As such, when the overwrite starting position cannot be determined, the tape recording apparatus 100 tries to determine the beginning position by shifting the overwrite starting position to the next DS as far as the DS for which the overwrite starting position cannot be determined is the NULL DS.

When the beginning position of the DS of the DS number i can be determined at step 910, the tape recording apparatus 100 sets the value of the counter i to the overwrite starting position A and keeps the overwrite starting position (step 925). Then, the tape recording apparatus 100 executes the overwriting from the determined beginning position of the DS of the DS number i (step 930). The tape recording apparatus 100 judges whether the overwriting of the DS of the DS number i succeeded or not (step 935). When the overwriting on the DS of the DS number i succeeded (step 935: YES), the tape recording apparatus 100 keeps the overwrite processing until no data is left (step 937). Then, the processing ends.

If the overwriting on the DS of the DS number i is failed at step 935, the tape recording apparatus 100 judges whether the DS to which the overwriting is failed is the NULL DS or not (S940). When the DS is the NULL DS (S940: YES), the operation proceeds to step 945. Then, the tape recording apparatus 100 increments the value of the counter i by one and judges whether the value of the counter i is equal to the value of the overwrite starting position A incremented by one or not (step 950). When the value of the counter i is equal to the value of the overwrite starting position A incremented by one (step 950: YES), the tape recording apparatus 100 tries to determine the beginning position of the DS of the DS number i as a new overwrite starting position (step 955).

When the beginning position of the DS of the DS number i can be determined (step 955: YES), the operation returns to step 930, where the tape recording apparatus 100 executes the overwriting from the determined beginning position of the DS of the DS number i. If the DS of the DS number i is not the NULL DS at step 915, if the DS for which the overwriting is failed is not the NULL DS at step 940, if the value of the counter i is not equal to the value of the overwrite starting position A incremented by one at step 905, or if the beginning position of the DS of the DS number i cannot be determined at step 955, the operation proceeds to step 960, where the tape recording apparatus 100 notifies the host device of the overwriting error. Then, the operation ends.

As described above, in the tape recording apparatus 100 according to the embodiment of the present invention, whether the overwrite starting position is shifted or not need not to be checked by accessing the cartridge memory in reading data. That means the processing for judging the data validity is not complicated when the cartridge memory cannot be accessed. Moreover, overwrite retrying need not be forbidden by considering that the processing for judging the data validity is complicated when the cartridge memory cannot be accessed. In the tape recording apparatus 100 according to the embodiment of the present invention, the data unit of a particular type that can be distinguished from the user data can be skipped for retrying the overwriting as far as the data unit is in such a type.

Although the present invention has been described above by use of the embodiment, the technical scope of the present invention is not limited to that described in the foregoing embodiment. It is apparent to those skilled in the art that various changes or modifications can be added to the foregoing embodiment. Therefore, as a matter of course, embodiments to which such changes or modifications are added can also be included in the technical scope of the present invention.

The invention claimed is:

1. A tape recording apparatus in communication with a tape medium, comprising:
    a head;
    a controlling unit to control the head to read and write data to data units on the tape medium, wherein the controlling unit performs operations, the operations comprising:
        determining a start data unit of the data units;
        determining from the start data unit an overwrite starting position by skipping the data units whose beginning position cannot be determined until one of the data units having a beginning position that can be determined is reached; and
    performing an overwrite operation at the determined overwrite starting position at the data unit whose beginning position can be determined.

2. The tape recording apparatus of claim 1, wherein the skipping the data units whose beginning position cannot be determined comprises determining for each data unit whose position cannot be determined whether the data unit is a null data unit, wherein the data unit is skipped in response to determining that the data unit is the null data unit.

3. The tape recording apparatus of claim 2, wherein the operations further comprise:
    indicating an overwrite error in response to determining that the data unit whose beginning position cannot be determined does not comprise the null data unit.

4. The tape recording apparatus of claim 1, wherein the determination of the overwrite starting position by skipping begins from an initial overwrite starting position indicated in an overwrite request.

5. The tape recording apparatus of claim 2, wherein the data units indicated as the null data unit are not returned as user data to a host.

6. The tape recording apparatus of claim 1, wherein the operations further comprise:
in response to the overwrite operation not succeeding, determining whether the data unit at which the overwrite operation failed is the null data unit; and
in response to determining that the data unit is the null data unit, performing the overwrite operation at a next data unit sequentially following the data unit at which the overwrite operation failed.

7. The tape recording apparatus of claim 6, wherein the overwrite operation is retried only one after failure at the overwrite starting position.

8. A control method for controlling data overwriting on a tape medium recording apparatus, comprising:
determining a start data unit of data units;
determining from the start data unit an overwrite starting position by skipping the data units whose beginning position cannot be determined until one of the data units is having a beginning position that can be determined is reached; and
performing an overwrite operation at the determined overwrite starting position at the data unit whose beginning position can be determined.

9. The method of claim 8, wherein the skipping the data units whose beginning position cannot be determined comprises determining for each data unit whose position cannot be determined whether the data unit is a null data unit, wherein the data unit is skipped in response to determining that the data unit is the null data unit.

10. The method of claim 9, further comprising:
indicating an overwrite error in response to determining that the data unit whose beginning position cannot be determined does not comprise the null data unit.

11. The method of claim 8, wherein the determination of the overwrite starting position by skipping begins from an initial overwrite starting position indicated in an overwrite request.

12. The method of claim 9, wherein the data units indicated as the null data unit are not returned as user data to a host.

13. The method of claim 8, further comprising:
in response to the overwrite operation not succeeding, determining whether the data unit at which the overwrite operation failed is the null data unit; and
in response to determining that the data unit is the null data unit, performing the overwrite operation at a next data unit sequentially following the data unit at which the overwrite operation failed.

14. The method of claim 13, wherein the overwrite operation is retried only one after failure at the overwrite starting position.

15. A computer storage device including programs executed by a processor to control data overwriting of data units on a tape medium by performing operations, the operations, comprising:
determining a start data unit of the data units;
determining from the start data unit an overwrite starting position by skipping the data units whose beginning position cannot be determined until one of the data units having a beginning position that can be determined is reached; and
performing an overwrite operation at the determined overwrite starting position at the data unit whose beginning position can be determined.

16. The computer storage device of claim 15, wherein the skipping the data units whose beginning position cannot be determined comprises determining for each data unit whose position cannot be determined whether the data unit is a null data unit, wherein the data unit is skipped in response to determining that the data unit is the null data unit.

17. The computer storage device of claim 16, wherein the operations further comprise:
indicating an overwrite error in response to determining that the data unit whose beginning position cannot be determined does not comprise the null data unit.

18. The computer storage device of claim 15, wherein the determination of the overwrite starting position by skipping begins from an initial overwrite starting position indicated in an overwrite request.

19. The computer storage device of claim 16, wherein the data units indicated as the null data unit are not returned as user data to a host.

20. The computer storage device of claim 15, wherein the operations further comprise:
in response to the overwrite operation not succeeding, determining whether the data unit at which the overwrite operation failed is the null data unit; and
in response to determining that the data unit is the null data unit, performing the overwrite operation at a next data unit sequentially following the data unit at which the overwrite operation failed.

21. The computer storage device of claim 20, wherein the overwrite operation is retried only one after failure at the overwrite starting position.

* * * * *